United States Patent
Kaga et al.

(10) Patent No.: US 8,947,208 B2
(45) Date of Patent: Feb. 3, 2015

(54) IC TAG SEARCHING APPARATUS

(75) Inventors: Kikuo Kaga, Tokyo (JP); Shigeo Ashizawa, Tokyo (JP)

(73) Assignee: Mitomo Corporation, Kanagawa (JP)

( * ) Notice: Subject to any disclaimer, the term of this patent is extended or adjusted under 35 U.S.C. 154(b) by 181 days.

(21) Appl. No.: 13/820,295

(22) PCT Filed: May 9, 2011

(86) PCT No.: PCT/JP2011/061115
§ 371 (c)(1),
(2), (4) Date: Mar. 1, 2013

(87) PCT Pub. No.: WO2012/046470
PCT Pub. Date: Apr. 12, 2012

(65) Prior Publication Data
US 2013/0162410 A1 Jun. 27, 2013

(30) Foreign Application Priority Data
Oct. 4, 2010 (JP) .................. 2010-224934

(51) Int. Cl.
*H04Q 5/22* (2006.01)
*G06K 19/07* (2006.01)
(Continued)

(52) U.S. Cl.
CPC ............. *G06K 19/0723* (2013.01); *G01S 13/82* (2013.01); *G01S 2007/027* (2013.01)
USPC ..... 340/10.1; 340/10.2; 340/10.5; 340/572.4; 340/572.7; 340/572.8; 342/450

(58) Field of Classification Search
CPC ................ G06K 19/0723; G01S 13/82; G01S 2007/027
USPC .............. 340/10.1, 10.2, 572.4, 572.7, 572.8; 342/450
See application file for complete search history.

(56) References Cited

U.S. PATENT DOCUMENTS

| 5,771,002 A | * | 6/1998 | Creek et al. ............... 340/539.21 |
| 6,335,685 B1 | * | 1/2002 | Schrott et al. ............... 340/572.1 |

(Continued)

FOREIGN PATENT DOCUMENTS

| JP | 2004-500550 | 1/2004 |
| JP | 2004-138398 | 5/2004 |

(Continued)

OTHER PUBLICATIONS

International Search Report issued Jun. 7, 2011 in International (PCT) Application No. PCT/JP2011/061115.

*Primary Examiner* — Tai T Nguyen
(74) *Attorney, Agent, or Firm* — Wenderoth, Lind & Ponack, L.L.P.

(57) ABSTRACT

An IC tag searching apparatus capable of changing the shape of its searching board in a simple manner in accordance with the situations of a location to be searched, said location includes wide to narrow areas and areas in the corners, at the time of searching the positions of wireless IC tags those which are embedded in a concrete construction and the like, efficiently detecting the positions of the embedded wireless IC tags and performing reading and writing of information from/to the wireless IC tags is provided.

The IC tag searching apparatus 10 according to the present invention comprises a plurality of plate members 2, 3 each having an antenna built-in, said plate members may be joined with each other in a direction of those flat surfaces, respectively, a joining means provided to the plate members having an antenna built-in and information transmission/reception section 11 for performing data transmission/reception between the plate member having an antenna built-in and the R/W main body 9.

14 Claims, 11 Drawing Sheets

(51) Int. Cl.
*G01S 13/82* (2006.01)
*G01S 7/02* (2006.01)

(56) References Cited

U.S. PATENT DOCUMENTS

| | | | |
|---|---|---|---|
| 6,915,072 B2 * | 7/2005 | Takahashi et al. | 396/296 |
| 7,511,604 B2 * | 3/2009 | Raphaeli et al. | 340/10.2 |
| 2003/0043067 A1 | 3/2003 | Johansson et al. | |
| 2007/0139285 A1 | 6/2007 | Maruyama et al. | |

FOREIGN PATENT DOCUMENTS

| | | |
|---|---|---|
| JP | 2004-279210 | 10/2004 |
| JP | 2004-319140 | 11/2004 |
| JP | 2006-093977 | 4/2006 |
| JP | 2006-220576 | 8/2006 |
| JP | 2007-145435 | 6/2007 |
| JP | 2009-157530 | 7/2009 |
| JP | 2009-188498 | 8/2009 |

\* cited by examiner (A)

(B)

(A)

(B)

IC TAG SEARCHING APPARATUS

FIELD OF THE INVENTION

The present invention relates to an apparatus for searching IC tags, particularly to an apparatus for searching IC tags having been embedded in a concrete construction, which is configured to search said IC tags from the outside of the concrete construction and to perform reading and writing of information from or to said IC tags.

BACKGROUND ART

For the maintenance of a concrete construction, for example, it is known to persons skilled in the art to incorporate wireless IC tags, in which various information on a product, into a concrete construction and to manage the quality of the built concrete and the history of the construction by means of a management system employing such wireless IC tags in view of validating strength of the construction against earthquake, history of the construction and the like.

Besides, the product management for products being in any of liquid, viscous and semi-solid state in the manufacturing process, such as fresh concrete and thermoplastic resins, has been executed product by product by writing various data to wireless IC tags in advance, then embedding those IC tags into the product before having been cured to enclose them in the product, and reading said data from and/or writing new information to the wireless IC tags having been cured in the product by means of a radio communication.

In quality management of a concrete construction by means of wireless IC tags, when it is intended to obtain information written in the IC tag having been embedded in a concrete construction from the outside, it is required to search the location of the embedded wireless IC tags. For this purpose, it is known until today to use a searching apparatus, which is adapted to creep on the exterior surface of the concrete construction, and the preset part of which lights when it has come onto a point where a wireless IC tag has been embedded.

Further, as a searching system for product management, a method for detecting a distance and/or a position to an objective product to which an IC tag is stuck by transmitting radio waves to which the IC tag reacts from a reader, measuring the time until said radio waves has been returned, and detecting the distance and/or the position to the objective product based on the measured time (Patent Document 1) and another method for searching the source of sending information by receiving radio waves from an exterior information source as the preliminary searching by means of a directional antenna, calculating a reception level at that time, to store the level, carrying out the real searching again to compare the obtained reception level with the maximum value of the reception level at the preliminary searching and searching the source of sending information based on the detected maximum value (Patent Document 2) are known.

REFERENCE OF THE PRIOR ART

Patent Documents

[Patent Document 1]: Japanese Unexamined Patent Application Publication No. 2007-145435
[Patent Document 2]: Japanese Unexamined Patent Application Publication No. 2004-279210

SUMMARY OF THE INVENTION

In said method of manually moving a searching board of a searching apparatus along the exterior surface of a concrete construction to which wireless IC tags having been embedded has such a drawback that, when it is not possible to cause the same searching board to creep over the wide flat area to the area of narrow width of the concrete construction, it is necessary to replace the searching board in accordance with the location to be searched, since the searching board is configured in a large size in order to efficiently search over the wide area of the concrete construction and is formed in a plate structure having a wide dimension in both longitudinal and horizontal directions. Said method has further drawback of difficulty in manually moving the searching board along the vertical wall surface of the concrete construction since the searching board with a wide bottom is so heavy, whereby the searching tends to be limited to the floor surfaces of the concrete construction.

It is therefore the object of the present invention to provide an IC tag searching apparatus which can change the shape of its searching board in a simple manner at the working site in accordance with the situation in which the searching apparatus locates, said situation could range over wide locations having wide to narrow areas and being at the corners, when the apparatus searches the locations of wireless IC tags embedded in a concrete construction and the like, to thereby efficiently perform detection of the embedded wireless IC tags, and to read and write information from/to the wireless IC tags.

It is another object of the present invention to provide an IC tag searching apparatus which can make the surface area of the searching board larger when it performs the searching on a wide floor or a wide horizontal location of a concrete construction and can make the whole shape of the searching board smaller when it performs the searching on a vertical surface or on a ceiling to thereby make easy to carry out the searching continuously over the areas through a floor surfaces, wall surfaces and ceiling surfaces.

In order to achieve the object described above, the IC tag searching apparatus according to the present invention is characterized in that it comprises plate members each having an antenna built-in, said plate members may be joined in the direction of those flat surfaces and separated from one another, and further provided with a radio means for detecting IC tags, joining means adapted to join the plate members each having an antenna built-in one another and being provided to the plate member having an antenna built-in, and information transmission/reception section for performing data transmission/reception between the plate member having an antenna built-in and the reader/writer main body.

According to one embodiment of the present invention, said plate member having an antenna built-in is characterized by being provided with an operation rod adapted for moving said plate member.

According to another embodiment of the present invention, said operation rod is characterized by being rotatably attached to the plate member having an antenna built-in.

According to further embodiment of the present invention, a turning member adapted for turning the IC tag surface to be searched is characterized by being provided to the reverse surface of plate member having an antenna built-in.

According to still further embodiment of the present invention, a adsorption means adapted to be adsorbed to the IC tag surface to be searched is characterized by being provided to the reverse surface of the plate member having an antenna built-in.

According to still further embodiment, the joining means is characterized by being a convex-concave interdigitation means to be formed in the lateral side of the plate member having an antenna built-in.

According to still further embodiment of the present invention, the joining means is characterized by being a joining member to be installed between two plate members each having an antenna built-in and being adapted to connect said two plate members each having an antenna built-in to each other, said joining member is both attachable and detachable relative to the plate member having an antenna built-in.

According to still further embodiment of the present invention, the information transmission/reception section is characterized in that it performs transmission and reception of radio signals between itself and the reader/writer main body being separated from the plate member having an antenna built-in.

According to still further embodiment of the present invention, the information transmission/reception section is characterized in that it performs transmission and reception of signals between itself and the reader/writer main body of the inserted-type which is configured so as to be inserted into the plate member having an antenna built-in.

According to still further embodiment of the present invention, a terminal section adapted to electrically connect the plate members to each other is provided to the lateral side of the plate member having an antenna built-in.

According to the present invention, at a working site for searching IC tags embedded in a construction built with concrete, etc., the dimension and shape of the searching board of the IC tag searching apparatus can be changed in a simple manner in accordance with the figuration of the location to be searched, and the searching works on various forms of constructions and reading/writing operations of information from/to the IC tags can be achieved in rapid and efficient way.

Furthermore, according to the present invention, the numbers of the searching boards to be joined may be altered at the searching site to adopt the weight and dimension of the searching boards in total, thereby enabling to execute continuous searching works of the IC tags on the vertical walls and ceilings of the constructions to be searched in easy and safe manner and to perform reading/writing operations of information from/to the IC tags.

DESCRIPTION OF THE REFERENCE NUMERALS

Figure 1:
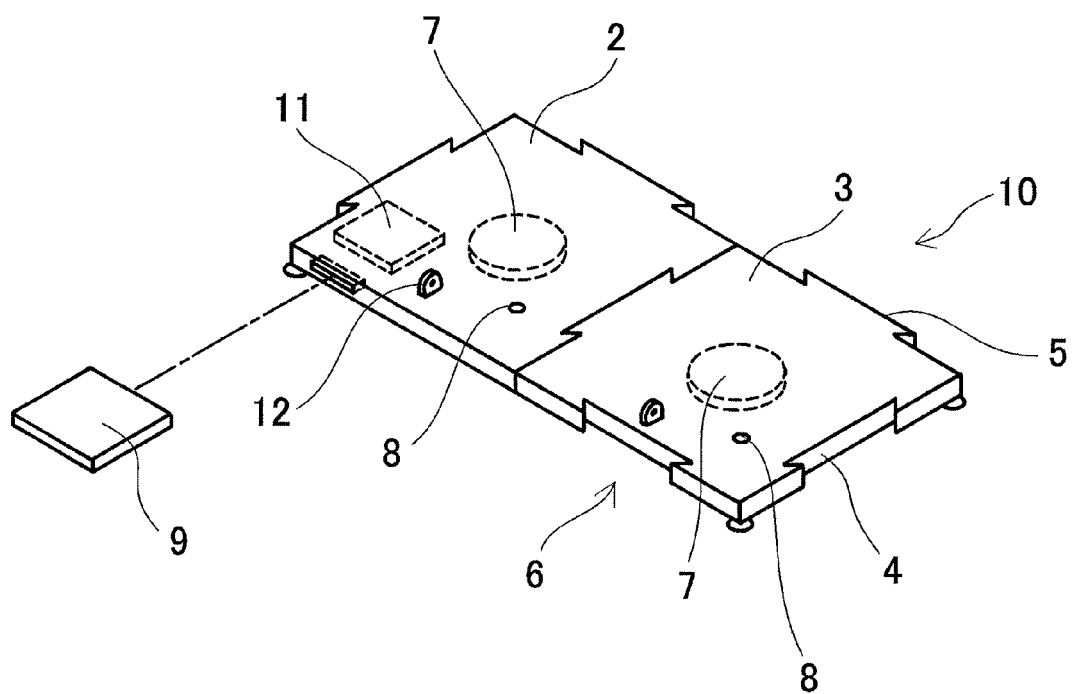
FIG. 1 is a perspective view showing the joining state of searching boards of the IC tag searching apparatus according to the Example 1 of the present invention.

10: IC tag searching apparatus
20: IC tag searching apparatus
2, 3, 16, 17, 18: Plate member
4: Dovetail
5: Solar plexus
6: Dovetail joint interdigitation section
7: Antenna
8: Display section
9: R/W main body
11: Transmission/reception section
22: Clasp member
24: Joining rod
25: Bracket
35: Spherical section
36: Acetabular socket section

DETAILED DESCRIPTION OF THE PREFERRED EMBODIMENTS

Preferred embodiments of the present invention will now be described, by way of example, with reference to the accompanying drawing. Note that, although the searching of wireless IC tags embedded in a concrete construction is exemplified in the following examples, the present invention is not limited to the searching of the IC tags in a concrete construction and is also applicable to the searching on structures made of synthetic resin and the like in those which said IC tags are embedded.

Figure 11:
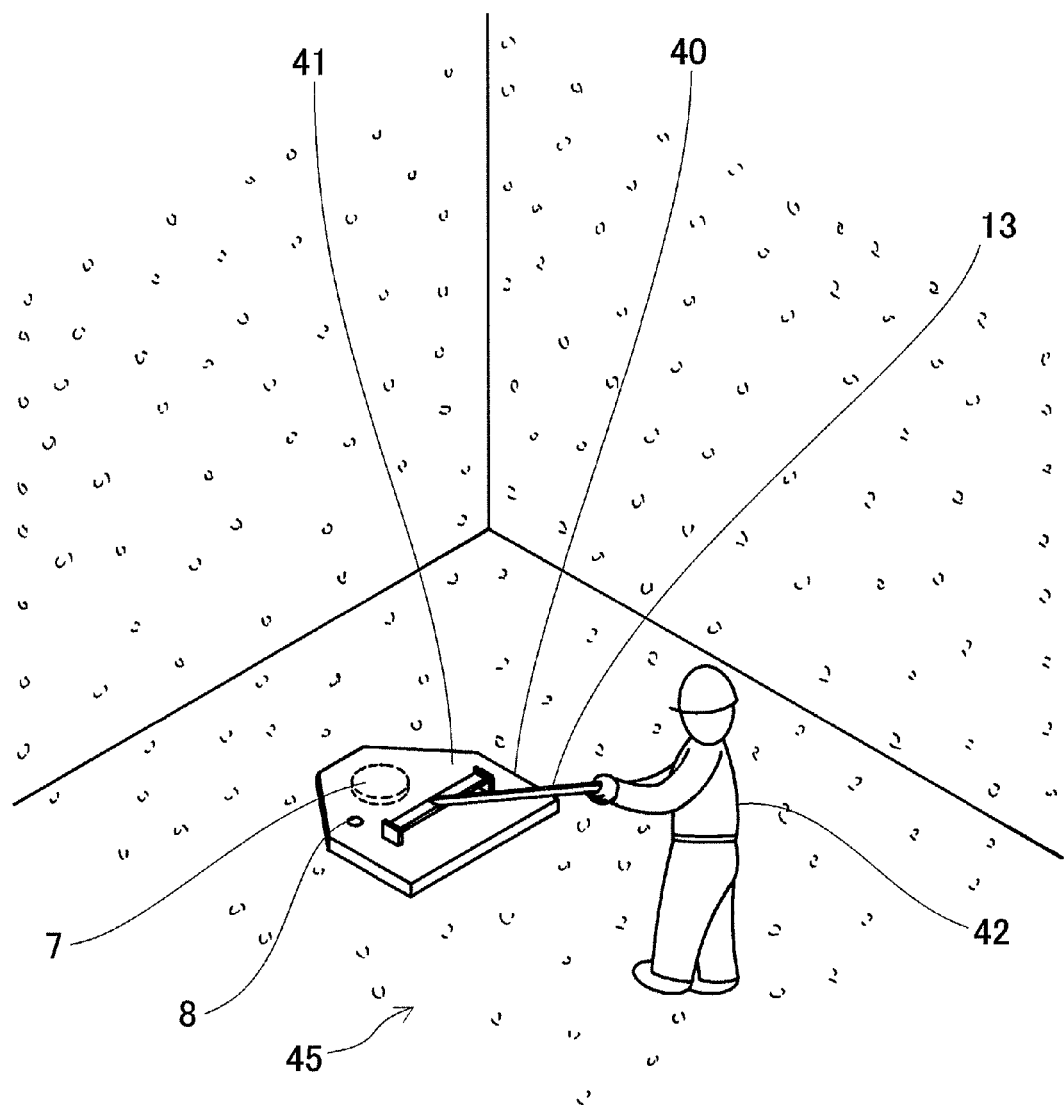
FIG. 11 is a perspective view showing the state that a conventional IC tag searching apparatus is searching IC tags on the floor surface of a concrete construction.

FIG. 11 is a perspective view showing an IC tag searching apparatus 40 of the conventional type being in the state of searching operation. A searching board 41 having a wide bottom surface has an antenna 7 built-in, and a display element 8 is provided on the upper surface of the searching board 41. The display element 8 receives radio waves at a given frequency sent from the antenna 7 and lights in response to signals beamed from the wireless IC tags embedded in a construction, to thereby indicate the position where the wireless IC tag is embedded. On the upper surface of the searching board, an operation rod is rotatably attached. As shown in the drawing, the operator 42 of the IC tag searching apparatus causes the searching board to move on the floor surface 45 of a concrete construction as if it creeps on the floor surface while grasping the operation rod 13, and marks a position where the display elements 8 lights to detect the position of the wireless IC tag embedded in the concrete construction. In this operation, transmission and reception of radio waves set at a preset frequency is carried out between the reader/write (hereinafter referred to as R/W) having been held by the operator and the wireless IC tags via the antenna 7 provided on the searching board 41 so that reading of data having been written in the wireless IC tags and writing of newly-required data to the wireless IC tags can be accomplished.

The searching operation by means of the IC tags of the conventional type is thought to carry risk because said searching board used for the IC tag searching apparatus of the conventional type comprises a large integrated member with a wide area in order to raise efficiency of the searching operation and has a heavy weight, which requires great power to cause it creep on the walls and to move either up and down or right and left directions, and there could be an event sometime that the searching board might fall down. Further, it was a problem for the conventional searching apparatus that it cannot perform searching operation in a narrow space surrounded by walls, for example, since the size of the searching board is too large.

Figure 2:
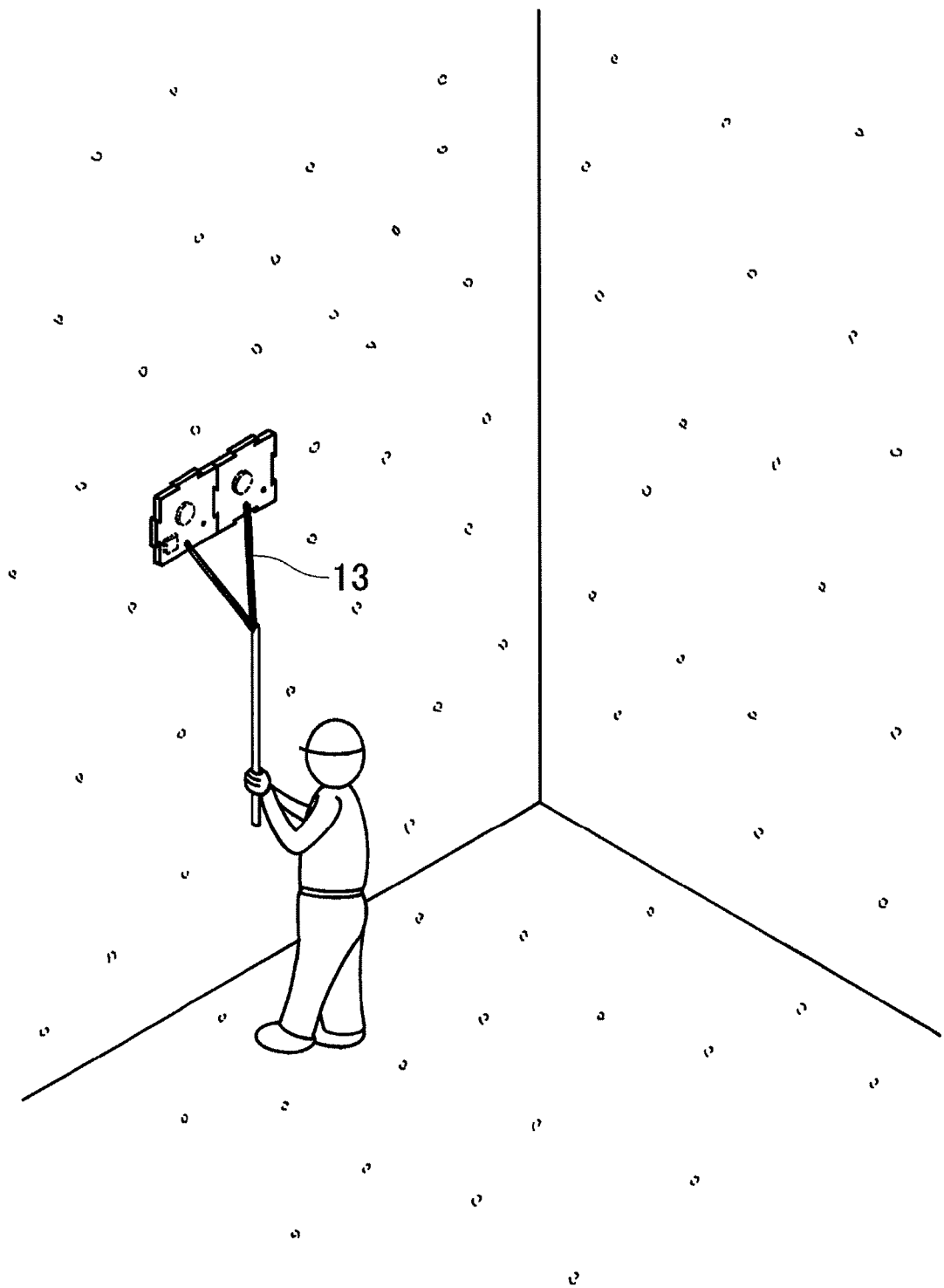
FIG. 2 is a perspective view showing the state of searching on the concrete wall using the IC tag searching apparatus according to Example 1 of the present invention.

FIG. 1 is a perspective view showing the IC tag searching apparatus according to Example 1 of the present invention, and FIG. 2 is a perspective view showing the state in which the IC tag searching apparatus according to Example 1 is searching the IC tags on a concrete wall surface. The IC tag searching apparatus 10 shown in FIG. 1 comprises two rectangular flat plate members 2, 3 functioning as the searching board, and a convex-concave interdigitation section is formed on the lateral sides of the flat plate members 2, 3, respectively, so that the flat plate members may be joined to each other side by side in the direction of those flat surfaces. Specifically, the lateral side of the flat plate member is configured to a dovetail joint interdigitation section 6 comprising a dovetail section 4 or a solar plexus section 5. In FIG. 1, the state in which two flat plate members 2, 3 are joined by means of the dovetail joint interdigitation section is shown, and this joint may be separated in a simple manner. Each of the flat plate members 2, 3 has an antenna 7 built-in, and a display section 8, e.g. an LED lamp, being adapted to light in response to signals transmitted from the wireless IC tag is mounted on the upper surface of the flat plate member 2, 3, respectively. Note that said signals transmitted from the wireless IC tag are caused to generate by the searching signals emitted from the antenna provided on the plate member. Therefore, the display section 8 lights when the plate member has moved as if it creeps on a concrete construction to reach to the position in which the wireless IC tag is embedded, which makes possible to detect the position of the wireless IC tag. Note that, the detection of the wireless IC tag may be accomplished not only by means of a lighting means such as the display section 8 described above, but also by means of a sound-based detection means such as a buzzer.

One of two joined plate members each having an antenna built-in has a transmission/reception element 11 which performs transmission and reception of radio waves between said element and the external R/W (reader/writer) main body 9. Further, a terminal section for electrically connecting the plate members to each other is formed in the lateral section of each plate member, and therefore, radio waves sent from the external R/W main body is transmitted via the terminal section to the other plate member having no transmission/reception element via an antenna 7. Other than searching the wireless IC tags embedded in a concrete construction by executing transmission and reception of radio waves between said element and the antenna, the searching apparatus can performs writing/reading of data to/from the wireless IC tag via the antenna by means of radio waves sent from the R/W main body. In this case, the transmission/reception radio waves transmitted from the R/W main body and the radio waves sent via the antenna may be used as radio waves to be set at different frequencies corresponding to the purpose of searching of wireless IC tags or reading/writing of information from/to an IC tag.

On the upper surface of the plate member, a bracket 12 for coupling operation rods 13 (FIG. 2), which is used to move the plate members by the operator at the time of searching of IC tags, is provided. The operation rods 13 are adapted to be rotatable against the bracket 12, respectively, the mechanism of which will be further described later. In Example 1 shown in FIG. 1, a suitable adsorption pad 39 is attached to the reverse side of the plate member. Said adsorption pad 39 applies slight adsorbent action or suitable frictional action against the surface to be searched of a concrete construction to temporarily hold the plate member on the surface to be searched so that the plate member supported by the operation rod 13 does not easily slide to move or slide to fall (in case of being on the vertical wall), thereby enabling liability of the writing and reading of information to/from the wireless IC tags to be improved. This feature is particularly effective for the searching on the surface of a vertical wall.

Figure 3:
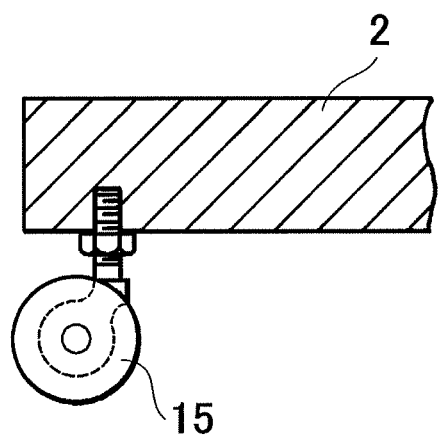
FIG. 3 is a side view showing an example of the turning member to be provided to the reverse surface of the searching board according to the present invention.

Alternatively, depending on the structure of a concrete construction to be searched, a rolling member 15 (FIG. 3), such as a wheel and a roller may be provided to the reverse side of the plate member so that the plate member can smoothly move on the surface to be searched of the concrete construction.

Figure 4:
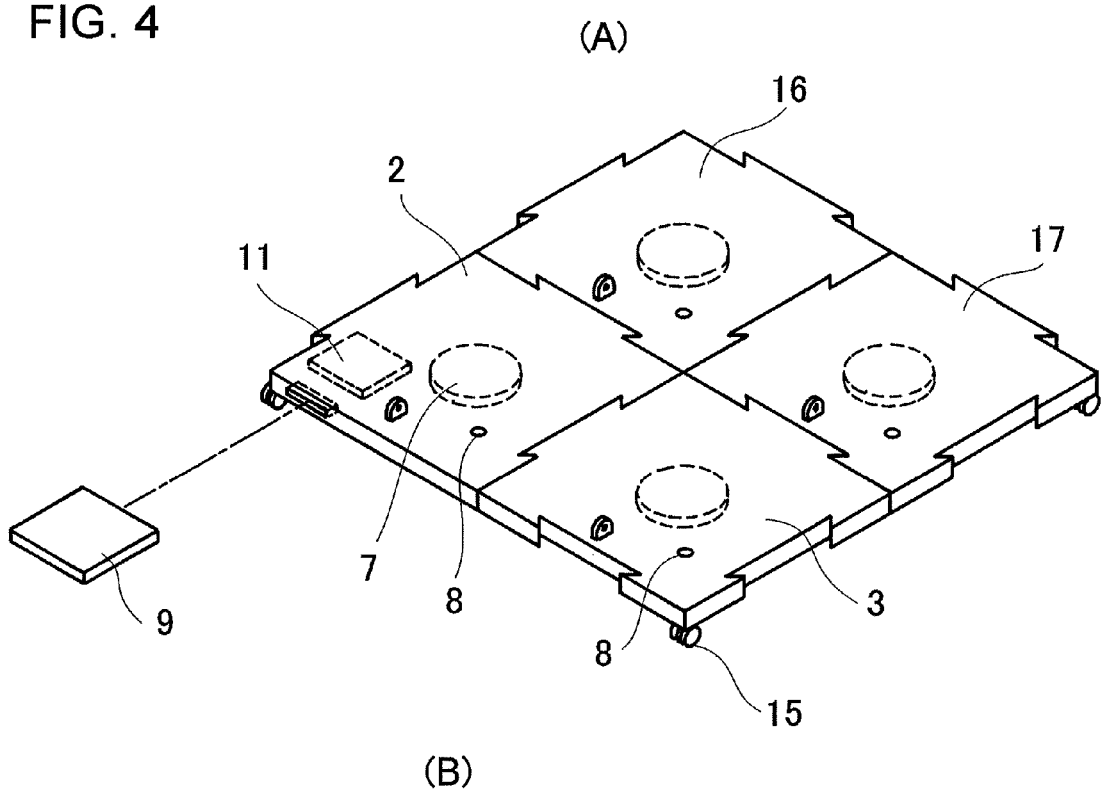
FIG. 4 shows the modification of the IC tag searching apparatus according to Example 1 of the present invention, wherein (A) is a perspective view showing the state in which four searching boards are joined, and (B) is a plane view showing the state in which three searching board are joined.
Figure 4:
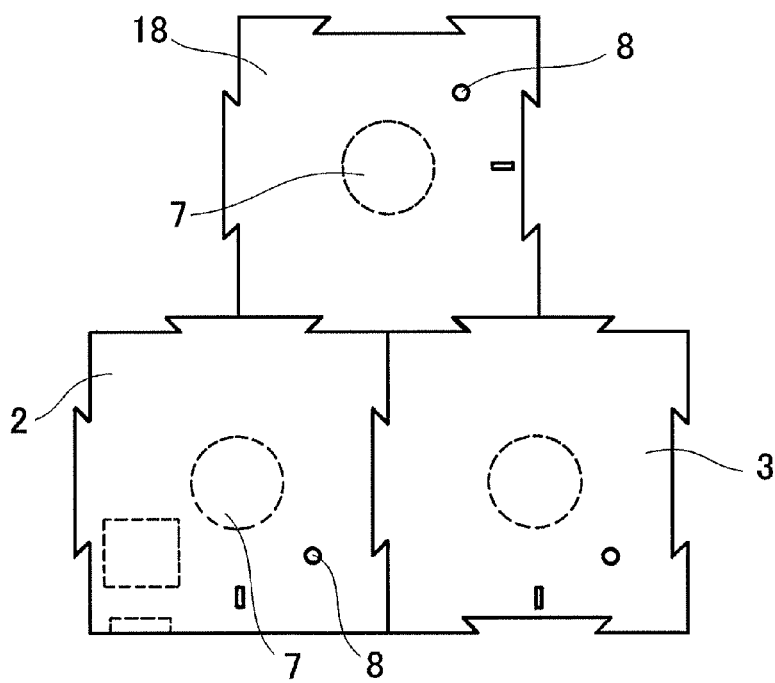

Although the searching apparatus is formed by joining two plate members to each other in Example 1 shown in FIG. 1, either one of those plate members may be removed to thereby carry out the searching with only one plate member in such a location where the surface to be searched is narrow to such an extent that two joined plate members cannot enter into the location. Besides, when the surface to be searched is so wide, three or more plate members may be joined adequately to make the searching apparatus in a larger size corresponding to the area of the surface to be searched. FIG. 4(A) shows such a state that four plate members of the same external shape are joined by connecting the lateral sections of the plate members one another. Each plate member 2, 3, 16, 17 are electrically connected one another with those terminal sections formed at the lateral sides, respectively. It is configured that signals sent from the external R/W main body 9, which have been received by the transmission/reception section 11 formed in one of those plate members 2 via the terminal section, are also transmitted to the other three plate members 3, 16, 17. The plate members to be joined may be arranged not only in a square shape as a whole as shown in FIG. 4 (A) but also may be arranged side by side in one direction to form it in a rectangular shape as a whole. Namely, the plate members may be joined in an arbitrary shape corresponding to the figuration of the location to be searched. FIG. 4(B) shows an example wherein three plate members 2, 3, 18 are joined. The shape of the joined plate members as a whole may be promptly changed at the actual searching operation site so that the joined plate members can adapt to the situation of the location to be searched.

Figure 5:
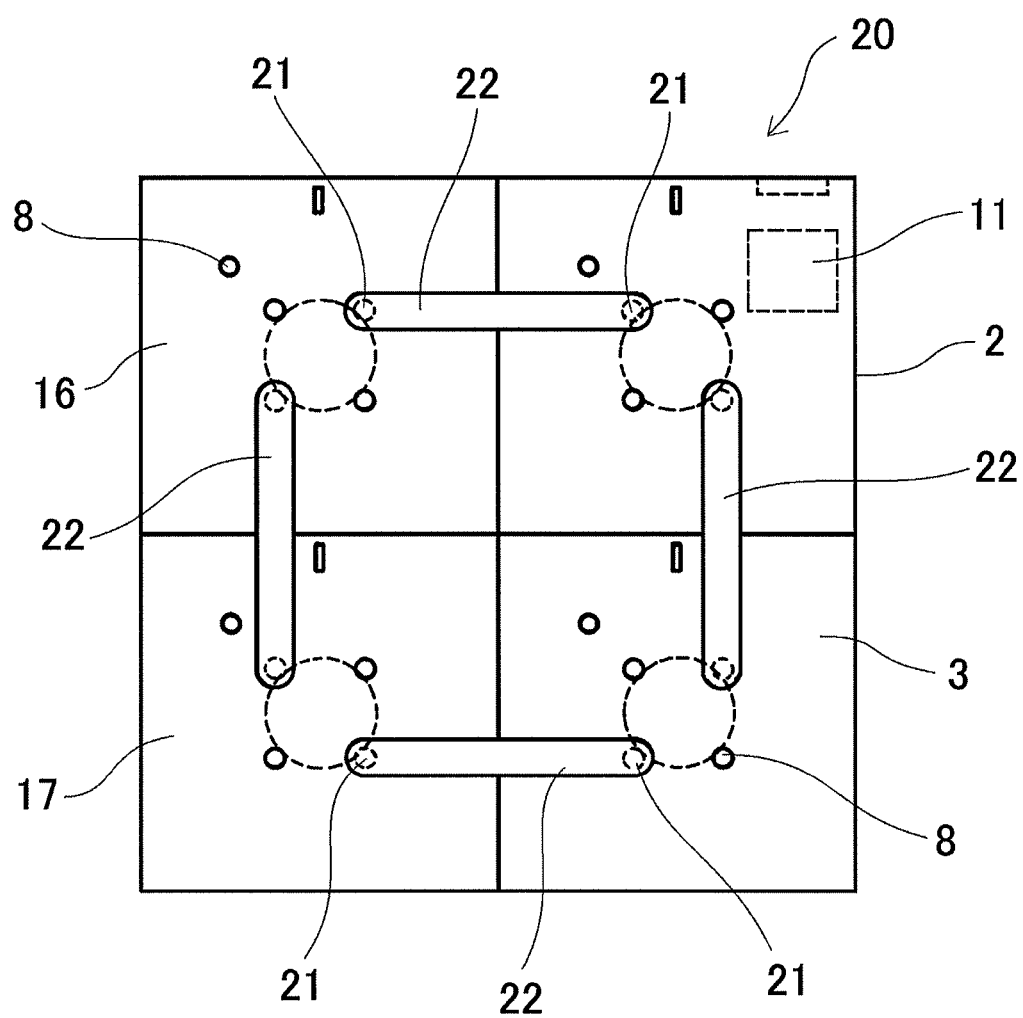
FIG. 5 is a plane view of the IC tag searching apparatus according to Example 2 of the present invention.

FIG. 5 is a plane view showing the structure of the joined plate members of the searching apparatus 20 according to Example 2 of the present invention. In Example 2, an example wherein a stopper means is used as a joint member for joining the plate members constituting the searching board. Pin-like protrusions 21 are formed on the surfaces (upper sides) of four plate members 2, 3, 16, 17, respectively, and stopper members are installed in such a manner that both ends of the stopper member 22 are inserted into the protrusions 21 to thereby join the two plate members 21, respectively. In this way, the plate members 2, 3, 16, 17 are joined one another, and those plate members are formed into the searching board being configured in a large square shape as a whole. The joined plate members 2, 3, 16, 17 may be easily separated by withdrawing the stopper member 22 from the protrusion 21.

For the means for joining the plate members, various known configurations other than the configurations described above may be adopted.

For example, the configuration in which pin holes are formed at the positions of the protrusions on the plate members 2, 3, 16, 17 in FIG. 5, a stopper member having pin insertion holes at both ends thereof is laid into the pin holes such that the stopper member strides over the pin holes, respectively, and the pins are inserted into the pin holes in the plate member from over the stopper member through the pin insertion hole, can be applied. Note that the stopper member needs not to be a metallic member, and the stopper member may be one made of a synthetic resin having the strength to be durable to the joining to the plate member.

Figure 6:
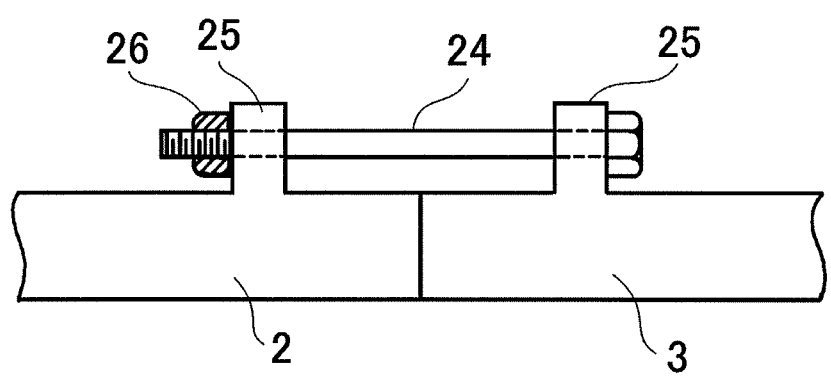
FIG. 6 is a side view showing the joining member of the searching board according to Example 3 of the present invention.

Further, the configuration, in which brackets 25 each having a horizontal hole for insertion of the joining rod are provided on the upper surface of the plate members 2, 3 as shown in FIG. 6, the joining rod 24 provided with a head section is inserted from one direction through the brackets 25 on the adjacent plate members 2, 3, and the other end of the inserted joining rod is fixed by screwing with a fixing nut 26, may also be adopted. In either of the above-described configurations, the joining and separation of the plate members 2, 3 can be done easily and speedy at the operation site.

Figure 7:
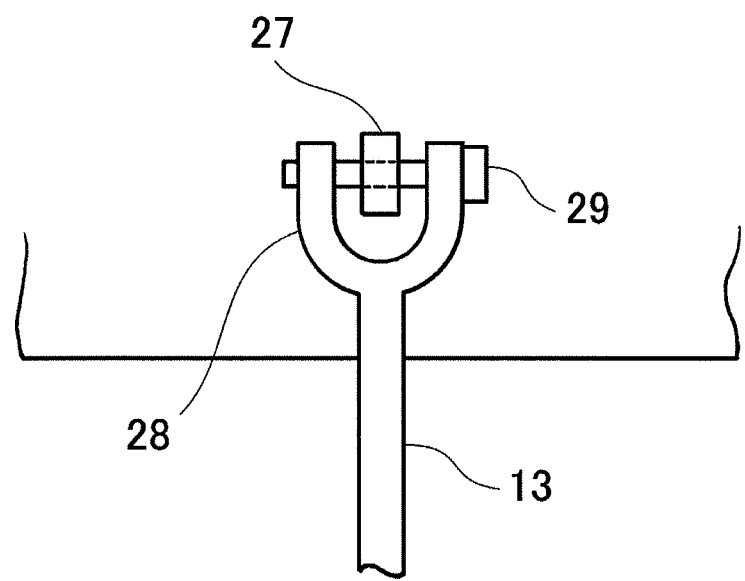
FIG. 7 is a front view showing the operation rod connection section of the searching apparatus according to Example 4 of the present invention.
Figure 8:
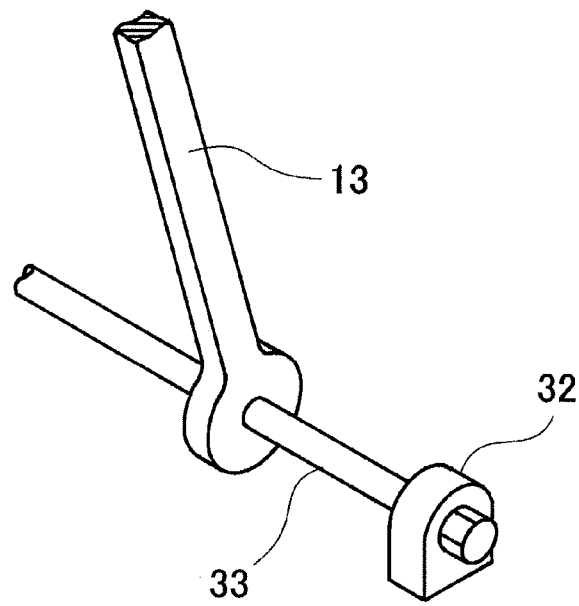
FIG. 8 (A) is a perspective view showing a part of the operation rod connection section of the searching apparatus according to Example 5 of the present invention and FIG. 8 (B) is a front view of the said operation rod connection section.
Figure 8:
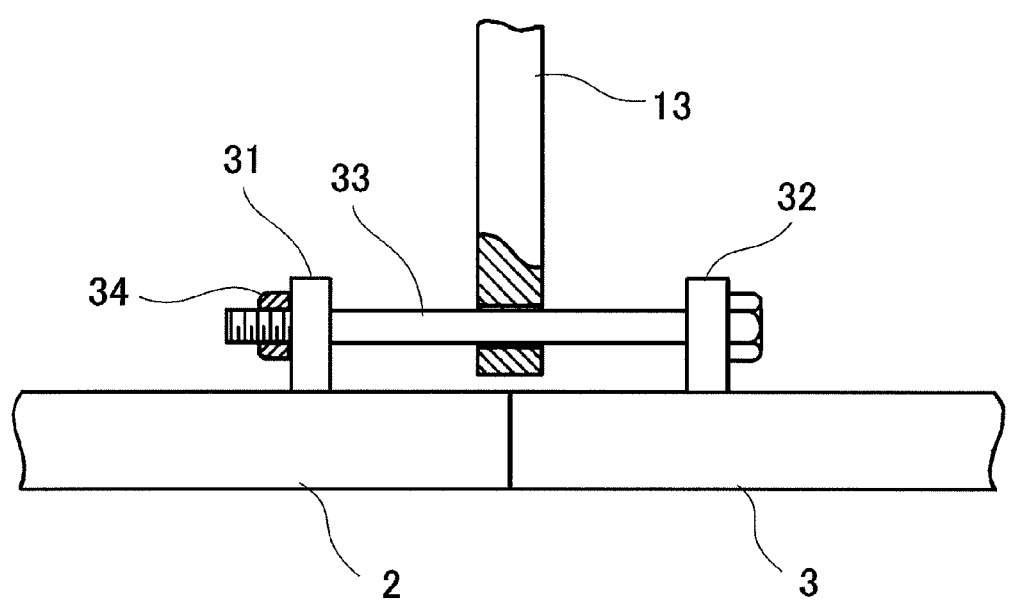
Figure 9:
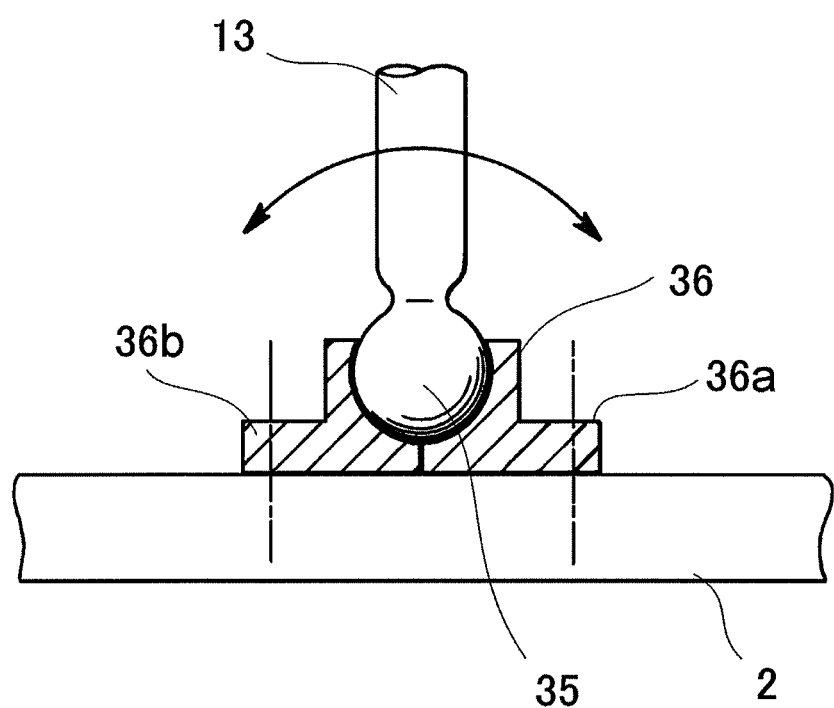
FIG. 9 is a front view showing the operation rod connection section of the searching apparatus according to Example 6 of the present invention.

In the IC tag searching apparatus according to the present invention, an operation rod for moving the searching board along the surface to be searched is mounted on the upper surface of the searching board so as to be rotatable with respect to the searching board. FIGS. 7 to 9 show different configurations of the joining section of the joining rods. In Example 4 shown in FIG. 7, it is configured such that an operation rod supporting bracket 27 is provided on the plate member 2, said bracket is clamped with a folk section 28 formed at the lower end of the joining rod 13, and a supporting pin 29 is inserted from the folk section 28 into the bracket 27. The operation rod 13 is rotatable around the supporting pin 29.

In Example 5 shown in FIG. 8, it is configured such that a long supporting rod 33 is inserted into operation rod supporting brackets 31, 32 so as to join said supporting brackets fixed on the adjacent plate members 2, 3 and the lower end of the operation rod 13 is rotatably inserted into the supporting rod 33. It is also configured in this example such that a rod fixing nut 34 is fixed by screwing at the tip of the supporting rod 33 and the operation rod 13 can be removed easily by removing said nut when the plate members 2, 3 need to be released from the joining.

In Example 6 shown in FIG. 9, it is configured such that the lower end of the operation rod 13 is formed into a spherical shape and an acetabular socket section 36 adapted to fit with a spherical section 35 of the operation rod 13 is formed on the upper surface of the plate member 2 so that the operation rod 13 can rotate in any arbitrary directions. Note that, in this example, it is further configured such that the acetabular socket section 36 is divided to two socket half bodies 36*a*, 36*b*, said spherical section 35 of the operation rod 13 is clamped so as to be received by the socket half bodies 36*a*, 36*b* from both end sides thereof, and these half socket bodies are then fixed to the plate member 2 with a screw, respectively so that the spherical section 35 is fitted to the socket section 36.

Figure 10:
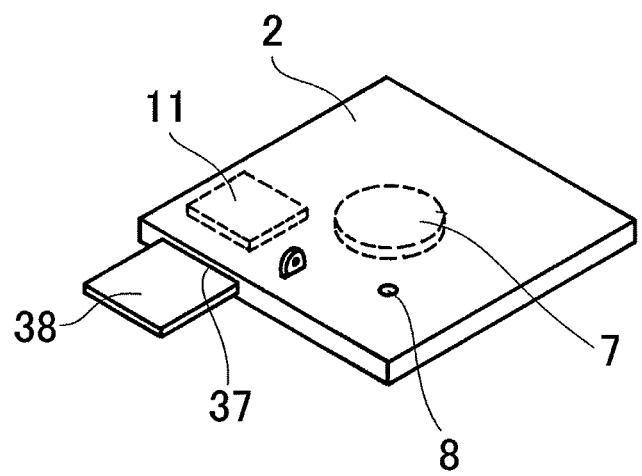
FIG. 10 is a perspective view of the searching apparatus which employs an R/W main body of the insertion-type according to Example 7 of the present invention.

In Examples 1 to 6 as described above, the external RAY main body is configured such that the operator may wear said R/W main body and signals are transmitted to or received from the transmission/reception section of the plate member via radio communication. However, it may be configured as well in such a way that the RAY main body is inserted into the plate member in advance to thereby directly transmit or receive signals by means of electrical contact between said R/W main body and the transmission/reception section. In Example 7 shown in FIG. 10, single plate member into which the insertion-type R/W main body has been inserted is shown in a perspective view. In this example, it is configured in such a structure that the insertion-type RAV main body 38 is inserted into the opening for insertion 37 formed in the lateral side of the plate member 2 in the vicinity of the transmission/reception section 11 provided inside the plate member 2 to connect the insertion-type R/W main body 38 to the transmission/reception section 11, and that information for writing preset in the R/W main body 38 is written to or read from the wireless IC tag embedded in a concrete construction via the antenna 7.

According to the present invention, the dimension, shape and the like as a whole of the searching board may be adjusted in a simple way in accordance with the figuration of the location to be searched at the site where the searching of IC tags embedded in a concrete construction is carried out, and the searching operation relative to constructions of various structures and reading/writing information from/to the wireless IC tags can be executed in speedy and efficient way.

What is claimed is:

1. An IC tag searching apparatus comprising;
   a plurality of plate members each having an antenna built-in, said plate members being joined in a direction of those flat surfaces and separated from one another, and further provided with a radio means for detecting IC tags, respectively,
   a joining means adapted to join the plate members each having an antenna built-in one another and being provided to the plate member having an antenna built-in, wherein said joining means is a concave/convex interdigitation means formed in a lateral side of said plate member having an antenna built-in;
   a terminal section for electrically connecting the plate members one another is formed in the lateral side of said plate member, and
   an information transmission/reception section for performing data transmission/reception between the plate member having an antenna built-in and an insertion type reader/writer main body, wherein said information transmission/reception section performs transmission and reception of signals between said section and the insertion-type reader/writer main body that inserted into said plate member having an antenna built-in.

2. An IC tag searching apparatus according to claim 1, wherein an operation rod for moving the plate member having an antenna built-in is attached to said plate member.

3. An IC tag searching apparatus according to claim 2, wherein said operation rod is rotatably attached to the plate member having an antenna built-in.

4. An IC tag searching apparatus according to claim 3, wherein a turning means for turning the IC tag surface to be searched is provided to a reverse surface of said plate member having an antenna built-in.

5. An IC tag searching apparatus according to claim 4, wherein an adsorption means adapted to adsorb to the IC tag surface to be searched is provided to a reverse surface of said plate member having an antenna built-in.

6. An IC tag searching apparatus according to claim 3, wherein an adsorption means adapted to adsorb to the IC tag surface to be searched is provided to a reverse surface of said plate member having an antenna built-in.

7. An IC tag searching apparatus according to claim 2, wherein a turning means for turning the IC tag surface to be searched is provided to a reverse surface of said plate member having an antenna built-in.

8. An IC tag searching apparatus according to claim 7, wherein an adsorption means adapted to adsorb to the IC tag surface to be searched is provided to a reverse surface of said plate member having an antenna built-in.

9. An IC tag searching apparatus according to claim 2, wherein an adsorption means adapted to adsorb to the IC tag surface to be searched is provided to a reverse surface of said plate member having an antenna built-in.

10. An IC tag searching apparatus according to claim 1, wherein a turning means for turning the IC tag surface to be searched is provided to a reverse surface of said plate member having an antenna built-in.

11. An IC tag searching apparatus according to claim 10, wherein an adsorption means adapted to adsorb to the IC tag surface to be searched is provided to a reverse surface of said plate member having an antenna built-in.

12. An IC tag searching apparatus according to claim 1, wherein an adsorption means adapted to adsorb to the IC tag surface to be searched is provided to a reverse surface of said plate member having an antenna built-in.

13. An IC tag searching apparatus according to claim 1, wherein said joining means comprises a joining member to be installed in between the plate members each having an antenna built-in for joining the plate members each having an antenna built-in one another, said joining member is both attachable and detachable relative to the plate member having an antenna built-in.

14. An IC tag searching apparatus according to claim 1, wherein said information transmission/reception section performs transmission and reception of radio waves between said section and the exterior reader/writer main body being separated from the plate member having an antenna built-in.

* * * * *